(12) United States Patent
Block et al.

(10) Patent No.: US 6,295,543 B1
(45) Date of Patent: Sep. 25, 2001

(54) METHOD OF AUTOMATICALLY CLASSIFYING A TEXT APPEARING IN A DOCUMENT WHEN SAID TEXT HAS BEEN CONVERTED INTO DIGITAL DATA

(75) Inventors: Hans-Ulrich Block; Thomas Brückner, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/155,703

(22) PCT Filed: Mar. 21, 1997

(86) PCT No.: PCT/DE97/00583

§ 371 Date: Oct. 5, 1998

§ 102(e) Date: Oct. 5, 1998

(87) PCT Pub. No.: WO97/38382

PCT Pub. Date: Oct. 16, 1997

(30) Foreign Application Priority Data

Apr. 3, 1996 (DE) ............................................... 196 13 400

(51) Int. Cl.[7] ..................................................... G06F 17/20
(52) U.S. Cl. ............................................... 707/530; 707/5
(58) Field of Search ................................... 707/500, 530, 707/501, 3, 5

(56) References Cited

U.S. PATENT DOCUMENTS

| | | | |
|---|---|---|---|
| 5,168,565 | * 12/1992 | Morita | 707/3 |
| 5,255,187 | * 10/1993 | Sorensen | 600/300 |
| 5,297,042 | * 3/1994 | Morita | 707/5 |
| 5,371,807 | * 12/1994 | Register et al. | 382/159 |
| 5,463,773 | * 10/1995 | Sakakibara et al. | 707/102 |
| 5,535,382 | * 7/1996 | Ogawa | 707/5 |
| 5,576,954 | * 11/1996 | Driscoll | 707/3 |
| 5,706,497 | * 1/1998 | Takahashi et al. | 707/5 |
| 6,088,692 | * 7/2000 | Driscoll | 707/5 |

FOREIGN PATENT DOCUMENTS 0 515 714 A1 * 12/1992 (EP) .
0 704 810 A1 * 4/1996 (EP) .

OTHER PUBLICATIONS

A. Dengel et al., "OFFICEMAID—A System for Office Mail Analysis, Interpretation and Delivery", Intl. Workshop on Document Analysis Systems, 1994, pp. 52–75.*

Hoch, "Using IR Techniques for Text Classification in Document Analysis", Proc. of 17th Intern. Conference on Research and Development in Information Retrieval, 1994, pp. 31–40.*

GERTWOL Lingsoft Oy—Questionnaire for Morpholympics, LDV–Forum Bd.11, Nr. 1, Jg. 1994, pp. 17–29.*

E. Charniak, "Statistical Language Learning", MIT Press, 1993, pp. 45–56.*

Weber, "Einführung in Die Wahrscheinlichkeitsrechnung Und Statistik Für Ingenieure", B.G. Teubner Stuttgart 1992, pp. 244–248 & pp. 193–194.*

* cited by examiner

Primary Examiner—Stephen S. Hong
(74) Attorney, Agent, or Firm—Schiff Hardin & Waite

(57) ABSTRACT

The text to be classified is compared with the contents of a relevance lexicon in which the significant words of the texts to be classified per text class and their relevance to the text classes is stored. The fuzzy set is calculated which specifies for the significant words of the text to be classified, their occurrence per text class and their relevance to the text class. A probability calculation is used for determining the probability with which the fuzzy set occurs per class for the corresponding class. The class having the highest probability is selected and the text is allocated to this class.

7 Claims, 4 Drawing Sheets

METHOD OF AUTOMATICALLY CLASSIFYING A TEXT APPEARING IN A DOCUMENT WHEN SAID TEXT HAS BEEN CONVERTED INTO DIGITAL DATA

BACKGROUND OF THE INVENTION

1. Field of the Invention

The present invention relates generally to a method for classifying text by significant words in the text.

2. Description of the Related Art

From the reference A. Dengel et al., 'Office Maid—A System for Office Mail Analysis, Interpretation and Delivery', Int. Workshop on Document Analysis Systems, a system is known by means of which, for example, business letter documents can be categorized and can then be forwarded, or stored selectively, in electronic form or paper form. For this purpose, the system contains a unit for segmenting the layout of the document, a unit for optical text recognition, a unit for address detection and a unit for contents analysis and categorization. For the segmentation of the document, a mixed bottom-up and top-down approach is used, the individual steps of which are Recognition of the contiguous components,
Recognition of the text lines,
Recognition of the letter segments,
Recognition of the word segments, and
Recognition of the paragraph segments.

The optical text recognition is divided into three parts:

Letter recognition in combination with lexicon-based word verification,
Word recognition, with the classification from letters and word-based recognition.

The address recognition is performed by means of a unification-based parser which operates with an attributed context-free grammar for addresses. Accordingly, text parts correctly parsed in the sense of the address grammar are the addresses. The contents of the addresses are determined via character equations of the grammar. The method is described in the reference M. Malburg and A. Dengel, 'Address Verification in Structured Documents for Automatic Mail Delivery'.

Information retrieval techniques for the automatic indexing of texts are used for the contents analysis and categorization. In detail, this takes place as follows:

Morphological analysis of the words
Elimination of stop words
Generation of word statistics
Calculation of the index term weight by means of formulas known from information retrieval such as, for example, inverse document frequency.

The index term weights calculated in this manner are then used for determining for all categories a three-level list of significant words which characterizes the respective category. As described in the reference A. Dengel et al., 'Office Maid—A System for Office Mail Analysis, Interpretation and Delivery', Int. Workshop on Document Analysis Systems, these lists are then manually revised after the training phase.

A new business letter is then categorized by comparing the index terms of this letter with the lists of the significant words for all categories. The weights of the index terms contained in the letter are multiplied by a constant depending on significance and are added together. Dividing this sum by the number of index terms in the letter then results in a probability for each class. The detailed calculations are found in the reference R Hoch, 'Using IR Techniques for Text Classification in Document Analysis'. The result of the contents analysis is then a list of hypotheses sorted according to probabilities.

SUMMARY OF THE INVENTION

The object forming the basis of the present invention consists in providing a method according to which the contents analysis of the text and thus the text classification is improved. In this connection, it is assumed that the text of the document is already available as digital data which are then processed further.

This object is achieved in accordance with the method for the automatic classification of a text applied to a document after the text has been transformed into digital data with the aid of a computer, in which each text class is defined by significant words, the significant words and their significance to the text class are stored in a lexicon file for each text class, a text to be allocated is compared with all text classes and, for each text class, the fuzzy set of words in text and text class and its significance to the text class is determined, the probability of the allocation of the text to the text class is determined from the fuzzy set of each text class and its significance to each text class, in which text class with the highest probability is selected and the text is allocated to this class.

Further developments of the invention are provided by further steps, wherein the text to be classified is morphologically analyzed in a morphological analyzer preceding the contents analysis, the morphologically analyzed text is supplied to a stochastic tagger in order to resolve lexical ambiguities, and the tagged text is used for text classification. Preferably, a relevance lexicon is generated for the classification of the text; for this purpose, a set of training texts is used, the classes of which are known; the frequencies of the classes, of words and of words in the respective classes are counted from this set; an empirical correlation between a word and class is calculated by means of these frequencies; this correlation is calculated for all words and all classes and the result of the calculation is stored in a file as a relevance of a word to a class, which file is used as a relevance file or a relevance lexicon.

In one embodiment, the correlation (or relevance) between a word and a class is established in accordance with the following formula:

$$rlv(w \text{ in } c) := r(w, c) = \frac{N \cdot \sum wc - \sum w \cdot \sum c}{\sqrt{(N \cdot \sum w^2 - (\sum w)^2) \cdot (N \cdot \sum c^2 - (\sum c)^2)}}$$

where:
N=number of training texts,
$\Sigma wc$=number of training texts of class c with word w,
$\Sigma w$=number of training texts with word w, $\Sigma c$=number of training texts of class c.

One embodiment provides that only correlations greater than a selected value r-max are taken into consideration, which value is established at a significance level of e.g. 0.001. In such embodiment, the text to be examined and relevance lexicon are used for determining for each class the fuzzy set of significant words per class and its relevance per class, from the fuzzy set per class and its relevance to each class, the probability of its fuzzy set of relevant words is calculated, and the class with the maximum probability is determined from the probabilities per class and the text is allocated to this class.

In this example, the probability is calculated in accordance with the formula $$\text{prob}(A) := \sum_x \mu A(x) \cdot p(x),$$

where μA is the membership function which specifies the extent to which the fuzzy set is allocated to a class, and which just corresponds to the correlation measure according to the above formula.

The present method may be used for automatic diagnosis from medical findings, in which the medical findings are considered to be the text and an illness is considered to be a class, in which method in a training phase the knowledge required for the classification is automatically learned from a set of findings the diagnosis of which is known, and a new finding is classified in accordance with the technique of fuzzy sets.

A case of application of the method is the automatic diagnosis from medical findings. If a medical finding is considered to be a text and an illness is considered to be a class, the problem of automatic diagnosis can be solved by means of the method of text classification. It is a considerable advantage of the method that it learns the knowledge needed for the classification automatically and unsupervised from a set of findings the diagnosis of which is known. There is no additional effort required by the doctor who only needs to write down the finding as usual. The learning takes place from the findings already in existence. After the training phase, a finding is then classified with the aid of the learned knowledge source and techniques of fuzzy sets. The class allocated to the findings corresponds to the illness diagnosed.

It is initially assumed that the text to be examined is already available in the form of ASCII data.

Preceding the contents analysis of a text, a morphological analysis is performed which morphologically analyses (i.e. reduces to their stem forms) all words in the first step and then resolves lexical ambiguities by means of a stochastic tagger. A method according to the publication from "LDV-Forum" can be used for the morphological analysis. A description of the tagger used can be found in the publication by E. Charniak, "Statistical Language Learning". The tagged text is always the starting point for all further processing steps.

The text classification is training-based. From a set of training texts, the classes of which are known, the frequencies of classes, of words overall and of words in the respective classes are counted. These frequencies are then used for calculating the empirical correlation between a word and a class according to Pearson H. Weber, 'Einführung in die Wahrscheinlichkeitsrechnung und Statistik für Ingenieure', (Introduction to probability calculation and statistics for engineers), pp. 193–194. This correlation is calculated for all words and all classes and is regarded as relevance of a word to a class.

Only correlations greater than a value r_max, which is obtained from checking the independence at a significance level of e.g. 0.001 are taken into consideration (see also, for example, H. Weber, 'Einführung in die Wahrscheinlichkeitsrechnung und Statistik für Ingenieure', (Introduction to probability calculation and statistics for engineers), p. 244). The result obtained is a lexicon which contains the relevances of the words to the classes.

After a text has been morphologically analyzed, it is classified with the aid of this relevance lexicon, as follows: for each class, a fuzzy set is determined which contains all relevant words. The membership function μA of the fuzzy set exactly corresponds to Pearson's correlation measure. To obtain the most probable class, the probability of its fuzzy set of relevant words is calculated for each class. This purpose is served by the formula from H. Bandemer and S. Gottwald, 'Einführung in Fuzzy-Methoden', (Introduction to fuzzy methods) normally used in fuzzy theory, namely:

$$\text{prob}(A) := \sum_x \mu_A(x) \cdot p(x),$$

where $\mu_A$ is the membership function of fuzzy set A of relevant words of a class and p(x) is interpreted as p(x is relevant to A):

p (x is relevant to A):=p(A|x)=p(x,A)/p(x)

As a result of the classification, the class with the most probable fuzzy set is output.

BRIEF DESCRIPTION OF THE DRAWINGS

The invention will be explained in greater detail with reference to an illustrative embodiment.

DETAILED DESCRIPTION OF THE PREFERRED EMBODIMENTS

Figure 1:
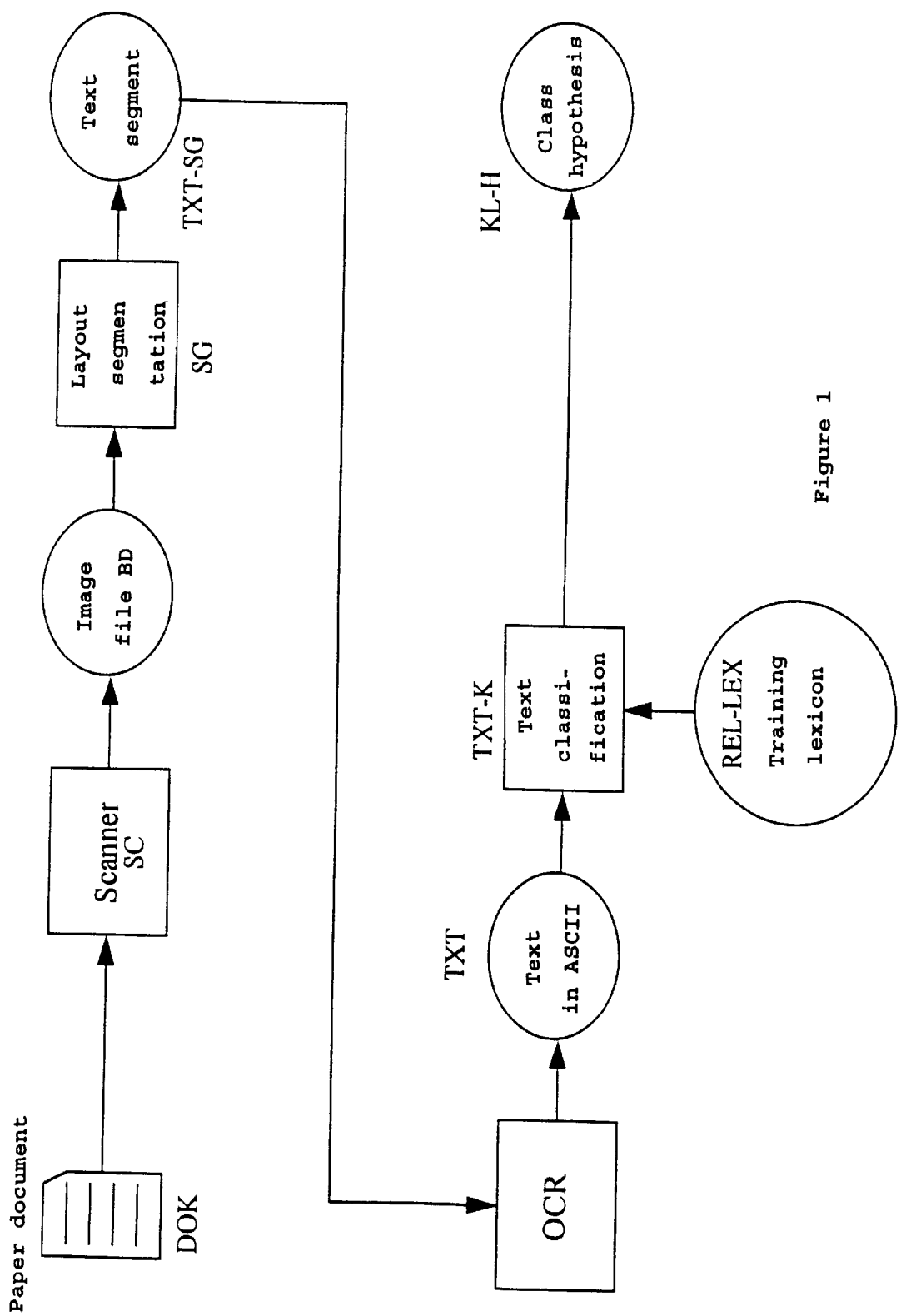
FIG. 1 is a block diagram which shows a basic representation of the method.
Figure 2:
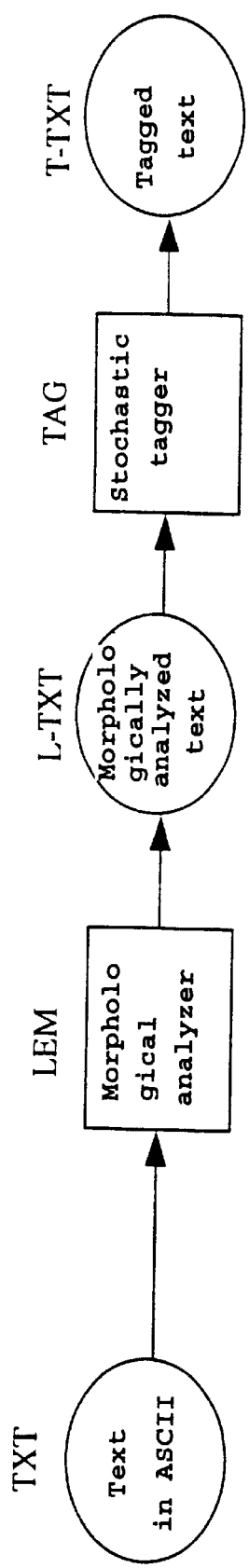
FIG. 2 is a block diagram which shows the sequence of preparation of the text.
Figure 3:
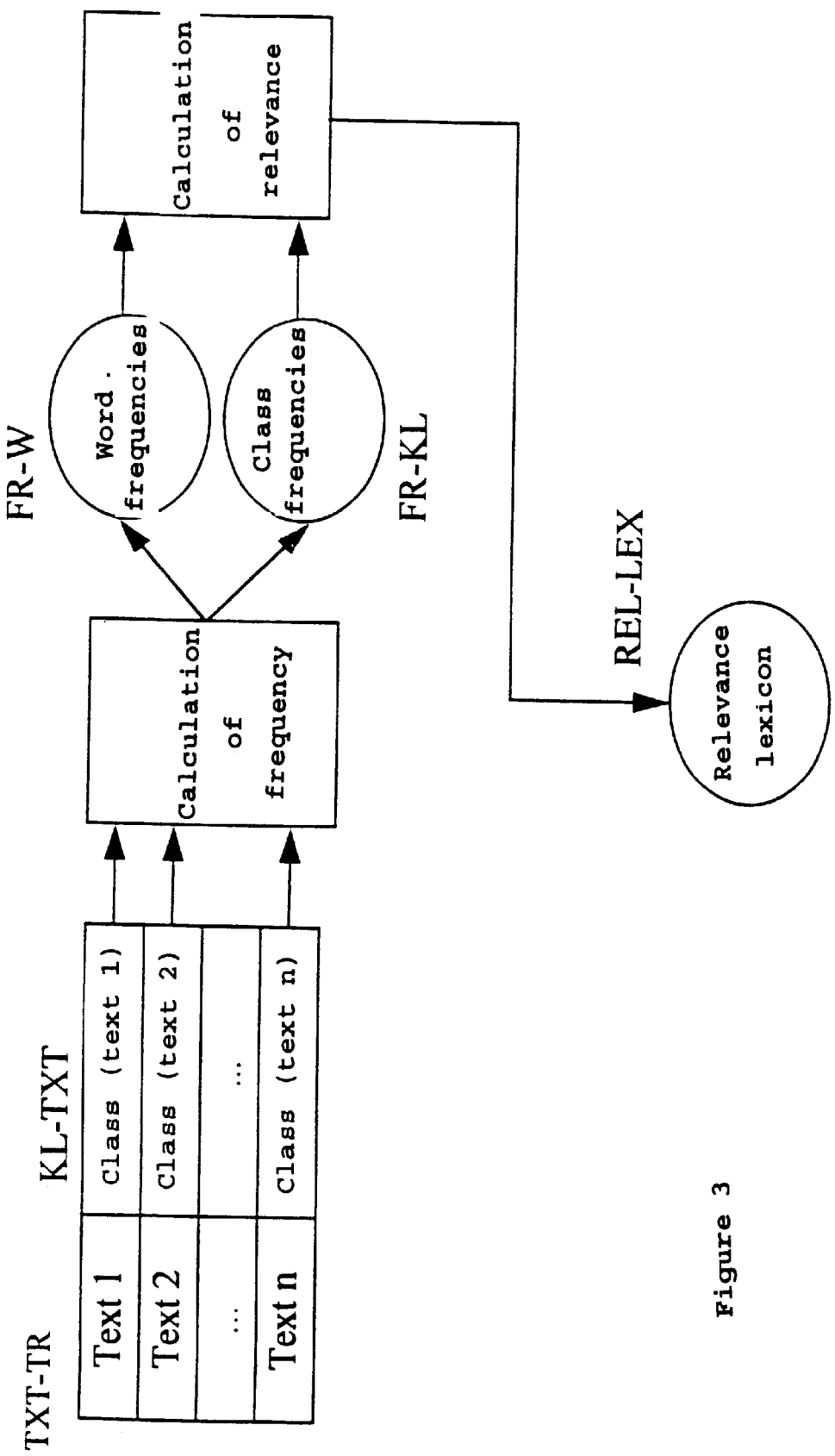
FIG. 3 is a block diagram which shows a method for training the system.

FIG. 1 shows a basic representation of the method. It is intended to classify the text on a paper document DOK. Firstly, the document DOK is scanned with the aid of a scanner SC and an image file BD is generated. The text to be classified is segmented in a layout segmentation SG and the text segment TXT-SG formed with the aid of the method known in European Patent Application 0 515 714 A1. This, in turn, provides an image file which now only contains the text part of the document. The image data of this text are then converted into ASCII data by means of an OCR (optical character recognition). These data are designated by TXT in FIG. 1. Using a training lexicon REL-LEX, the text classification TXT-K is performed and thus a class hypothesis is generated which specifies the probability with which the text to be classified can be allocated to a particular class. The class hypothesis is called KL-H in FIG. 1.

Preceding the contents analysis of the text TXT which is present in ASCII format, a morphological analysis is performed. For this purpose, all words of the text are morphologically analyzed, i.e. reduced to their stem forms, in the first step (with the aid of a morphological analyzer LEM which supplies the morphologically analyzed text L-TXT), and then lexical ambiguities are resolved by means of a stochastic tagger TAG. The result of this treatment of the text TXT is the tagged text T-TXT which can then be processed further. The operation of the morphological analyzer LEM is described in LDV-Forum and the structure and function of the tagger are described in E. Charniak, "Statistical Language Learning".

The tagged text T-TXT is then the starting point for the further processing steps.

Before the text classification can be performed, a training phase must be provided. In this training phase, a relevance lexicon REL-LEX is generated which will be used later for classifying texts. For this purpose, the frequencies of classes, of words overall and of words in the respective classes are counted from a set of training texts TXT-TR, the classes KL-TXT of which are known. This is done in a unit FR for frequency calculation in which the word frequencies FR-W and the class frequencies FR-KL are formed. Using these frequencies, the empirical correlation between a word and a class is calculated according to Pearson H. Weber, 'Einführung in die Wahrscheinlichkeitsrechnung und Statistik für Ingenieure', (Introduction to probability calculation and statistics for engineers), pp. 193–194:

$$rlv(w \text{ in } c) := r(w, c) = \frac{N \cdot \sum wc - \sum w \cdot \sum c}{\sqrt{(N \cdot \sum w^2 - (\sum w)^2) \cdot (N \cdot \sum c^2 - (\sum c)^2)}}$$

where:
N=number of training texts,
$\Sigma wc$=number of training texts of class c with word w,
$\Sigma w$=number of training texts with word w,
$\Sigma c$=number of training texts of class c.

This correlation is calculated for all words and all classes and is regarded as relevance REL of a word to a class. In this connection, care is taken that the correlations do not become too small, for which reason a value r-max is introduced which is set, for example, to a significance level 0.001, see the reference H. Weber, 'Einführung in die Wahrscheinlichkeitsrechnung und Statistik für Ingenieure', (Introduction to probability calculation and statistics for engineers), p. 244. The results, that is to say the relevances of a word to a class, are stored in a lexicon REL-LEX which thus contains the relevances of the words to the classes.

Figure 4:
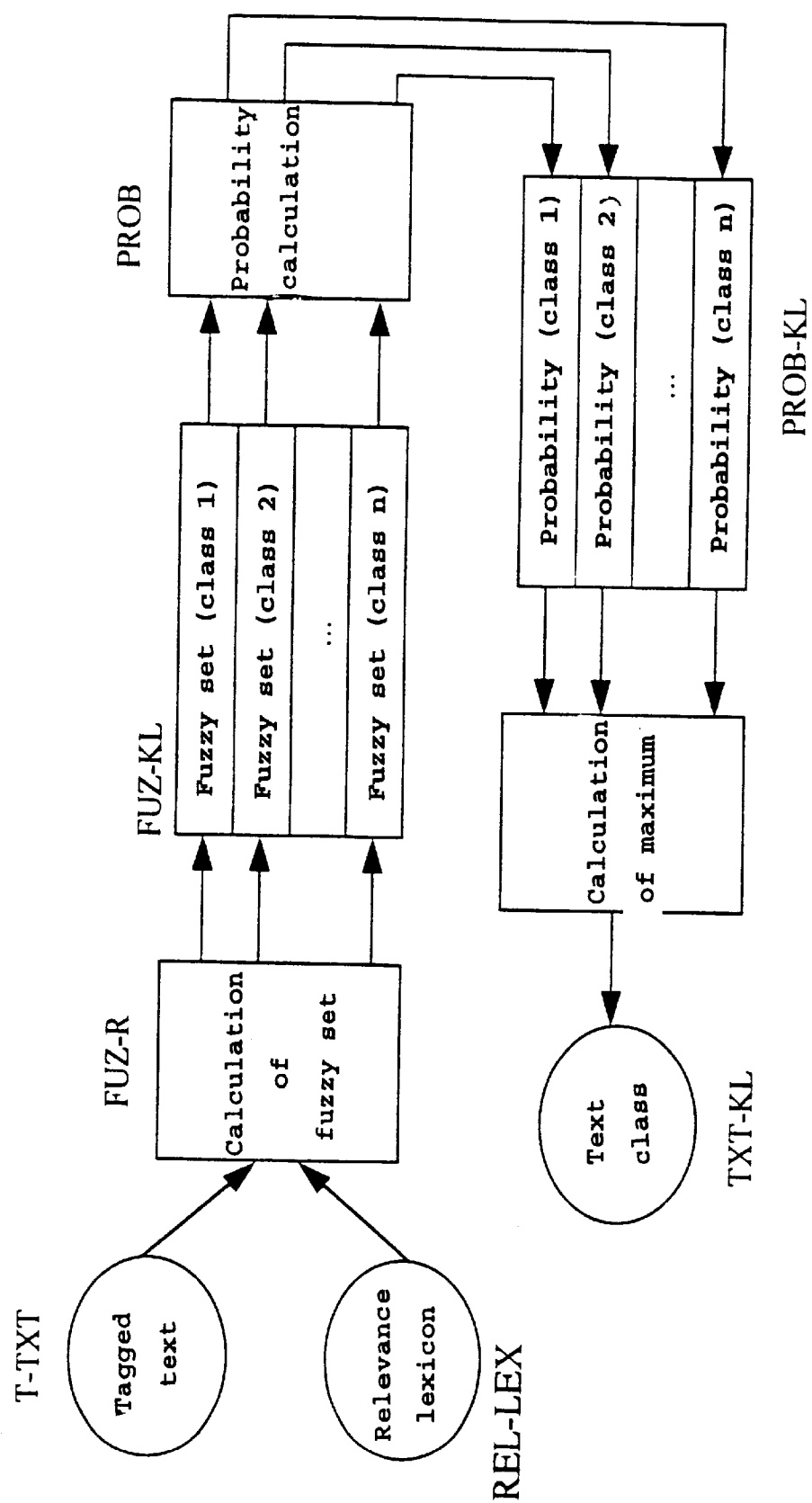
FIG. 4 is a block diagram which shows the method for classifying the text.

Once the relevance lexicon REL-LEX has been generated, the text T-TXT to be examined can then be classified. For this purpose, selected words of the text which are of significant importance are examined from the text with the relationships, existing in the relevance lexicon REL-LEX, between the words and the classes and a so-called fuzzy set FUZ-R is generated therefrom for the text and for each class. These fuzzy sets per class are stored in a file FUZ-KL. The fuzzy set per class contains the words of the text which occur in the class and their relevance to this class. From the fuzzy set, the probability of its fuzzy set of relevant words is calculated for each class in a unit PROB and stored in a file PROB-KL. For this purpose, the membership function of the fuzzy-set is determined in relation to that class which just corresponds to Pearson's correlation measure. The probability is calculated in accordance with the formula normally used in fuzzy theory and this formula has already been specified above and is known from H. Bandemer and S. Gottwald, 'Einführung in Fuzzy-Methoden', (Introduction to fuzzy methods). The class for which the highest probability has been calculated is selective in a unit MAX for maximum calculation. The text T-TXT is allocated to this class. This class is called TXT-KL in FIG. 4.

The method will be explained by means of the following application example:

News from the USENET Newsgroup de. comp. os. linux.misc is to be sorted into the following classes: printer, configuration, network, sound, external memory, video, software, development, kernel, communication, input devices, SCSI, X-Windows and operating system. The first processing step of a text is the morphological analysis. It transforms, for example, the German language sentence Beim Starten von X kommt mit der Mirage-P32 nur ein weißer Bildschirm into the morphologically analyzed form:

0 1 Beim beim prp
1 2 starten starten vfin
1 2 starten starten vinfin
2 3 von von prp
3 4 X x n
4 5 kommt kommen vfin
5 6 mit mit prp
5 6 mit mit vprt
6 7 der d pron
6 7 der der det
6 7 der der relpron
7 8 Mirage mirage n
9 - - -
9 10 P32 p32 n
10 11 nur nur adv
11 12 ein ein det
11 12 ein ein vprt
12 13 weisser weiss adjflk
13 14 Bildschirm bildschirm n
13 15 Bildschirm. bildschirm. $$$
13 14 Bildschirm. bildschirm. $$$
14 15 . . eos_punkt
14 15 . . punkt
15 16 $CR$ $CR $CR$ The tagger resolves the ambiguities in categories and basic forms:

0 1 Beim beim prp
1 2 starten starten vfin
2 3 von von prp
3 4 X xn
4 5 kommt kommen vfin
5 6 mit mit prp
6 7 der der det
7 8 Mirage mirage n
8 9 - - -
9 10 P32 p32 n
10 11 nur nur adv
11 12 ein ein det
12 13 weisser weiss adjflk
13 14 Bildschirm bildschirm n
14 15 . . . eos_punkt During the training, the following relevance lexicon was trained (excerpt): soundkarte_n
<konfiguration>rlv=0.12523
<netzwerk>rlv=−0.033766
<sound>rlv=0.716692
<externer speicher>rlv=−0.005260
monitor_n
<video>rlv=0.606806
drucker_n
<drucker>rlv=0.683538
<software>rlv=0.14210
gcc_n
<entwicklung>rlv=0.684036
<kernel>rlv=0.103325
<kommunikation>rlv=−0.083844
apsfilter_n
<drucker>rlv=0.561354
grafikkarte_n
<eingabegeraete>rlv=−0.008924
<konfiguration>rlv=0.017783
<scsi>rlv=−0.005854
<video>rlv=0.501108
xdm_n
<eingabegeraete>rlv=0.023704
<x-winows>rlv=0580419
scsi_n <eingabegeraete>rlv=−0.65260
<kernel>rlv=−0.026075
<konfiguration>rlv=0.117458
<netzwerk>rlv=−0.035671
<betriebssystem>rlv=−0.063972
<scsi>rlv=0.582414
<sound>rlv=−0.041297
<externer speicher>rlv=0.284832
<video>rlv=−0.107000
ethernet__n
<kommunikation>rlv=−0.012769
<netzwerk>rlv=0.502532
<betriebssystem>rlv=0.014134
x⁻n
<drucker>rlv=−0.073611
<eingabegeraete>rlv=0.005764
<entwicklung>rlv=0.073568
<kernel>rlv=0.005127
<kommunikation>rlv=−0.108931
<konfiguration>rlv=−0.055763
<netzwerk>rlv=−0.077721
<betriebssystem>rlv=−0.046266
<scsi>rlv=−0.054152
<sound>rlv=−0.037581
<externe speicher>rlv=−0.081716
<software>rlv=0.037474
<video>rlv=0.197814
<x-windows>rlv=0.299126
mirage__n
<scsi>rlv=0.065466
<video>rlv=0.221600
bildschirm__n
<drucker>rlv=−0.023347
<eingabegeraete>rlv=0.036846
<entwicklung>rlv=−0.022288
<konfiguration>rlv=−0.014284
<video>rlv=0.216536
<x-windows>rlv=0.269369
starten__vinfin
<kommunikation>rlv=0.002855
<konfiguration>rlv=0.060185
<betriebssystem>rlv=0.006041
<externe speicher>rlv=−0.001856
<x-windows>rlv=0.260549
starten__vfin
<drucker>rlv=−0.038927
<entwicklung>rlv =−0.037790
<kernel>rlv=−0.009309
<kommunikation>rlv=−0.057605
<konfiguration>rlv=0.035588
<netzwerk>rlv=0.045992
<betriebssystem>rlv=−0.003344
<sound>rlv=−0.019409
<externe speicher>rlv=−0.043312
<video>rlv=0.110620
<x-windows>rlv=0.178526

The following fuzzy sets are then formed for the classes:
Video={x (0.197814),mirage (0.221600), bildschirm (0.216536)}
X-Windows=
{starten (0.178526), x (0.299126), bildschirm (0.269369)}
Furthermore, the probabilities of the following words are known:

| Word | Video | X-Windows |
|---|---|---|
| x | 0.24 | 0.19 |
| mirage | 0.8 | |
| bildschirm | 0.43 | 0.33 |
| starten | 0.24 | 0.21 |

The probabilities of the classes are calculated from this and from the membership functions of the words:

Prob (Video)=0.197814*0.24+0.221600*0.8+0.216536*−0.43

Prob (X-Windows)=0.178526*0.21+0.299126*0.19+0.269369*0.33

Prob (video)=0.3

Prob (x-windows)=0.18

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for the automatic classification of a text applied to a document, after the text has been transformed into digital data with the aid of a computer, comprising the steps of:

morphologically analyzing the text to be classified in a morphological analyzer preceding the contents analysis, supplying the morphologically analyzed text to a stochastic tagger in order to resolve lexical ambiguities, using the tagged text for text classification, defining each text class by significant words, storing the significant words and their significance to the text class in a lexicon file for each text class, comparing a text to be allocated with all text classes and, for each text class, determining a fuzzy set of words in text and text class and its significance to the text class, determining probability of the allocation of the text to the text class from the fuzzy set of each text class and its significance to each text class, and selecting text class with the highest probability is and allocating the text to this class.

2. A method according to claim 1, generating a relevance lexicon for the classification of the text, for this purpose, using a set of training texts, the classes of which are known, counting the frequencies of the classes, of words and of words in the respective classes from said set, calculating an empirical correlation between a word and class by said frequencies, calculating said correlation for all words and all classes and storing a result of the calculation in a file as relevance of a word to a class, which file is used as relevance file or relevance lexicon.

3. A method according to claim 2, in which the correlation between a word and a class is established in accordance with the following formula:

$$rlv(w \text{ in } c) := r(w, c) = \frac{N \cdot \sum wc - \sum w \cdot \sum c}{\sqrt{(N \cdot \sum w^2 - (\sum w)^2) \cdot (N \cdot \sum c^2 - (\sum c)^2)}}$$

where:

$N$=number of training texts, $\Sigma wc$=number of training texts of class c with word w, $\Sigma w$=number of training texts with word w, $\Sigma c$=number of training texts of class c.

4. A method according to claim 3 in which only correlations>a selected value r-max are taken into consideration, which value is established at a significance level of 0.001.

5. A method according to claim 4, further comprising the steps of:

using the text to be examined and relevance lexicon for determining for each class the fuzzy set of significant words per class and its relevance per class, calculating from the fuzzy set per class and its relevance to each class, the probability of its fuzzy set of relevant words, determining the class with the maximum probability from the probabilities per class and allocating the text to this class.

6. A method according to claim 5 in which the probability is calculated in accordance with the formula $$\text{prob}(A) := \sum_x \mu A(x) \cdot p(x),$$

where $\mu A$ is the membership function which specifies the extent to which the fuzzy set is allocated to a class, and which just corresponds to the correlation measure according to the above formula.

7. A method according to claim 1, comprising:

automatic diagnosis from medical findings, considering medical findings to be the text and considering an illness to be a class, automatically learning in a training phase, the knowledge required for the classification from a set of findings the diagnosis of which is known, and classifying a new finding in accordance with the technique of fuzzy sets.

\* \* \* \* \*